(12) United States Patent
Esposito et al.

(10) Patent No.: US 11,627,438 B1
(45) Date of Patent: Apr. 11, 2023

(54) MOBILE DEVICE LOCATION-BASED IN PERSON MEETING SYSTEM, SOFTWARE, AND COMPUTER READABLE MEDIA

(71) Applicants: Brianna Esposito, Burlington, MA (US); Kathryn Dunn, Burlington, MA (US)

(72) Inventors: Brianna Esposito, Burlington, MA (US); Kathryn Dunn, Burlington, MA (US)

(*) Notice: Subject to any disclaimer, the term of this patent is extended or adjusted under 35 U.S.C. 154(b) by 0 days.

(21) Appl. No.: 17/877,254

(22) Filed: Jul. 29, 2022

Related U.S. Application Data

(60) Provisional application No. 63/270,026, filed on Oct. 20, 2021.

(51) Int. Cl.
*H04W 24/00* (2009.01)
*H04W 4/029* (2018.01)
*G06Q 10/1093* (2023.01)

(52) U.S. Cl.
CPC ........ *H04W 4/029* (2018.02); *G06Q 10/1095* (2013.01)

(58) Field of Classification Search
CPC .......................... H04W 4/029; G06Q 10/1095
See application file for complete search history.

(56) References Cited

U.S. PATENT DOCUMENTS

| | | | | |
|---|---|---|---|---|
| 2011/0238755 | A1* | 9/2011 | Khan ..................... | G06Q 50/01 709/204 |
| 2012/0271883 | A1* | 10/2012 | Montoya ................. | H04L 51/52 709/204 |
| 2019/0182637 | A1* | 6/2019 | France ................... | H04L 67/306 |

* cited by examiner

*Primary Examiner* — Erika A Washington
(74) *Attorney, Agent, or Firm* — Cygnet IP Law, P.A.; Stephen W. Aycock, II

(57) ABSTRACT

Computer-implemented methods, systems, and computer-readable media for mobile device location-based in person meeting are described.

5 Claims, 5 Drawing Sheets

MOBILE DEVICE LOCATION-BASED IN PERSON MEETING SYSTEM, SOFTWARE, AND COMPUTER READABLE MEDIA

RELATED APPLICATIONS

This application claims the benefit of U.S. Application No. 63/270,026, entitled "Mobile Device Location-Based In Person Meeting System, Software, and Computer Readable Media," and filed on Oct. 20, 2021, which is incorporated herein by reference in its entirety.

FIELD

Some implementations are generally related to mobile device software applications, and, in particular, to a mobile device location-based in person meeting application software program, system, and computer readable media.

BACKGROUND

Some conventional dating applications for mobile devices provide a way for users to view profiles of other dating application users and to initiate electronic communications with one or more selected users through text, image, audio, or video messaging. Some conventional dating apps may display other users within a given distance radius but may not take into consideration a venue or event that users may be present at. These conventional applications typically leave in person meeting up to the individual users to coordinate. Further, some conventional applications may not provide location check-in or checked-in location verification via mobile device location determination module.

A need may exist for a mobile device application to facilitate in person meetings at venues or events for which two or more users have checked-in with the application and indicated presence at the venue or event, where physical presence at the venue or event can be verified using the location determination module of a users' mobile devices.

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

SUMMARY

Some implementations can include a method. The method can include receiving a check-in message from a first mobile device, where the check-in message is associated with a location, comparing the location in the check-in message with location data of the first mobile device, and determining, based on the comparing, the first mobile device is within a given threshold distance of the location. The method can also include causing any other matching users associated with a respective mobile device checked-in to a same location as the first mobile device to be displayed on the first mobile device, and when a user associated with the first mobile device indicates interest in another user and the other user indicates interest in the user of the first mobile device, permitting the user and the other user to send in-person meeting requests to each other.

The method can further include when an in-person meeting request is received, displaying at least a portion of a user profile of an in-person meeting requestor on the first mobile device, when the in-person meeting request is accepted, transmitting an in-person meeting request message to a mobile device corresponding to the in-person meeting requestor, and when the in-person meeting request is declined, transmitting a decline message to the mobile device corresponding to the in-person meeting requestor.

The method can also include transmitting an in-person meeting request from the first mobile device to a mobile device of another user, wherein GUI elements are used to extend an invitation for an in-person meeting, and receiving a response from the mobile device of the other user, wherein the response includes one of an accepted invitation, no response, or a decline invitation response.

In some implementations, the check-in message includes an electronic indication that the first mobile device is present at the location based on electronic location information of the first mobile device. In some implementations, the electronic indication includes a received user selection of the location.

In some implementations, the electronic indication includes a location determined by the first mobile device. In some implementations, the location is determined using one or more of GPS, Wi-Fi, cellular radio location, Bluetooth, scanning an RF beacon via RF transceiver within the first mobile device or a visual beacon via an imaging sensor within the first mobile device.

The method can further include arranging an order of displayed other users according to a likelihood of matching, wherein the likelihood of matching includes one or more of a likelihood of receiving or granting an in-person meeting request from a user as determined by a machine learning model.

Some implementations can include a system having one or more processors coupled to a computer-readable medium having stored thereon software instructions that, when executed by the one or more processors, cause the one or more processors to perform operations. The operations can include receiving a check-in message from a first mobile device, where the check-in message is associated with a location, comparing the location in the check-in message with location data of the first mobile device, and determining, based on the comparing, the first mobile device is within a given threshold distance of the location.

The operations can also include causing any other matching users associated with a respective mobile device checked-in to a same location as the first mobile device to be displayed on the first mobile device, and when a user associated with the first mobile device indicates interest in another user and the other user indicates interest in the user of the first mobile device, permitting the user and the other user to send in-person meeting requests to each other.

The operations can further include, when an in-person meeting request is received, displaying at least a portion of a user profile of an in-person meeting requestor on the first mobile device, and when the in-person meeting request is accepted, transmitting an in-person meeting request message to a mobile device corresponding to the in-person meeting requestor. The operations can also include when the in-person meeting request is declined, transmitting a decline message to the mobile device corresponding to the in-person meeting requestor.

The operations can further include transmitting an in-person meeting request from the first mobile device to a mobile device of another user, wherein GUI elements are used to extend an invitation for an in-person meeting, and receiving a response from the mobile device of the other user, wherein the response includes one of an accepted invitation, no response, or a decline invitation response.

In some implementations, the location can be associated with a form of transportation. In some implementations, the location is a future location that the user and other user are travelling to. In some implementations, the location includes a multi-part location.

In some implementations, the multi-part location includes a mode of transportation forming a first part of the multi-part location and a destination venue forming a second part of the multi-part location.

In some implementations, the user and another user are permitted to connect based on the first part of the multi-part location and then arrange for an in person meeting at the second part of the multi-part location.

Some implementations can include a computer-readable medium having stored thereon software instructions that, when executed by one or more processors, cause the one or more processors to perform operations. The operations can include receiving a check-in message from a first mobile device, where the check-in message is associated with a location, comparing the location in the check-in message with location data of the first mobile device, and determining, based on the comparing, the first mobile device is within a given threshold distance of the location.

The operations can also include causing any other matching users associated with a respective mobile device checked-in to a same location as the first mobile device to be displayed on the first mobile device, and when a user associated with the first mobile device indicates interest in another user and the other user indicates interest in the user of the first mobile device, permitting the user and the other user to send in-person meeting requests to each other. The operations can further include when an in-person meeting request is received, displaying at least a portion of a user profile of an in-person meeting requestor on the first mobile device, and when the in-person meeting request is accepted, transmitting an in-person meeting request message to a mobile device corresponding to the in-person meeting requestor.

The operations can also include when the in-person meeting request is declined, transmitting a decline message to the mobile device corresponding to the in-person meeting requestor. The operations can further include transmitting an in-person meeting request from the first mobile device to a mobile device of another user, wherein GUI elements are used to extend an invitation for an in-person meeting, and receiving a response from the mobile device of the other user, wherein the response includes one of an accepted invitation, no response, or a decline invitation response.

In some implementations, the check-in message includes an electronic indication that the first mobile device is present at the location based on electronic location information of the first mobile device. In some implementations, the electronic indication includes a received user selection of the location.

In some implementations, the electronic indication includes a location determined by the first mobile device. In some implementations, the location is determined using one or more of GPS, Wi-Fi, cellular radio location, Bluetooth, scanning an RF beacon via RF transceiver within the first mobile device or a visual beacon via an imaging sensor within the first mobile device.

DETAILED DESCRIPTION

Figure 1:
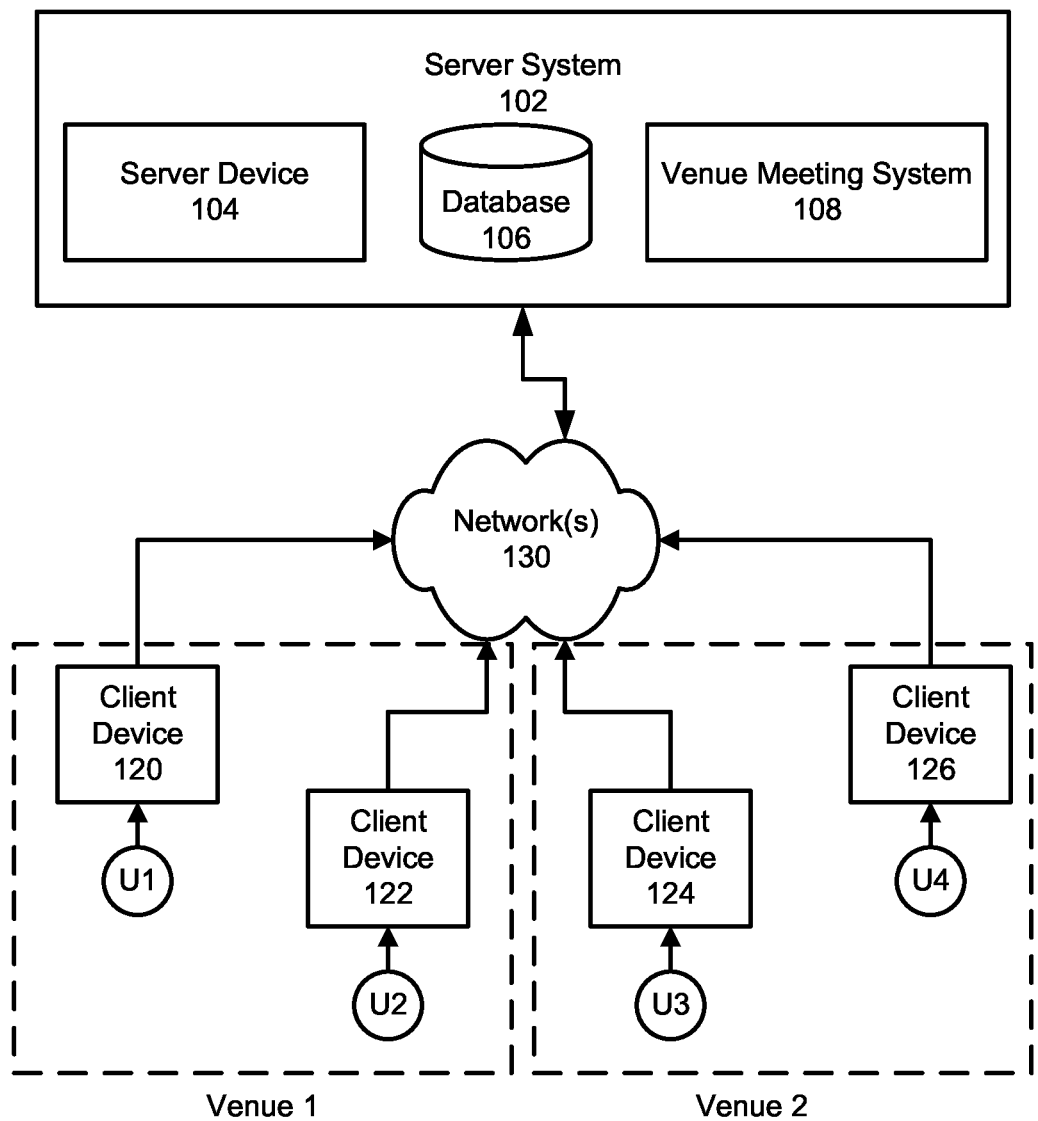
FIG. 1 is a block diagram of an example system and a network environment which may be used for one or more implementations described herein.

Some implementations include in-person meeting methods and systems. For example, in some implementations, once a user matches with someone in the location the user has checked into, a chat feature will be displayed that includes a button that says "Come Say Hi" or the like, which, when selected, will send a notification to the matches phone letting them know that their match is interested in them coining over. Further, some implementations can include a feature that permits a user to select if the user is looking for a casual relationship, serious relationship, or friendship. Thus, an implementation can include a friendship aspect in addition to or as an alternative to the dating aspect. An implementation can include just friendship, just dating, or both friendship and dating. Also, an implementation need not be limited to the categories of casual, serious, or friendship. Other categories could be used.

When performing in-person meeting facilitation functions, it may be helpful for a system to suggest potential matches between users and/or to make predictions about which users are likely to request and/or grant in-person meeting requests from one or more other users. To make predictions or suggestions, a probabilistic model (or other model as described below in conjunction with FIG. 4) can be used to make an inference (or prediction) about aspects of in-person meeting such as likelihood of a given user selecting another user at a venue or event for an in-person meeting. Accordingly, it may be helpful to make an inference regarding a probability that a user fits within one or more criteria of previous in-person meetings of another user. Other aspects can be predicted or suggested as described below.

The inference based on the probabilistic model can include predicting likelihood of an in-person meeting in accordance with image (or other user profile data) analysis and confidence score as inferred from the probabilistic model. The probabilistic model can be trained with data including previous in-person meeting request and/or grant data. Some implementations can include generating suggestions based on previous in-person meeting requests or grants.

The systems and methods provided herein may overcome one or more deficiencies of some conventional dating app systems and methods. For example, some conventional dating apps may primarily be concerned with facilitating matches and communications within the app in a virtual setting as opposed to an in-person meeting in a physical setting.

The example systems and methods described herein may overcome one or more of the deficiencies of conventional dating systems to provide users with automated suggestions for in-person meetings within venue or event in which both the viewing user and the user being suggested have checked-in at and optionally been verified to be at the venue or event using a location determining module of mobile devices of respective users. A technical problem of some conventional dating systems may be that such systems do not suggest matches for an in-person meeting within a specific venue or event in and/or predict a likelihood of an in-person meeting.

Particular implementations may realize one or more of the following advantages. An advantage of in-person meeting suggestions based on methods and system described herein is that the suggestions are based on previous user in-person meeting request and/or grant data and confidence. Yet another advantage is that the methods and systems described herein can dynamically learn new thresholds (e.g., for confidence scores, etc.) and provide suggestions for likely in-person meeting suggestions that match the new thresholds. The systems and methods presented herein automatically provide in-person meeting suggestions that are more likely to be accepted by users and that likely are more accurate. Further, by providing in-person meeting suggestions, some implementations can reduce electronic communications and thereby reduce the processor load and storage needs for the app as compared to some conventional dating apps in which most, if not all, of the communications occur within the dating app platform between user devices.

FIG. 1 illustrates a block diagram of an example network environment 100, which may be used in some implementations described herein. In some implementations, network environment 100 includes one or more server systems, e.g., server system 102 in the example of FIG. 1A. Server system 102 can communicate with a network 130, for example. Server system 102 can include a server device 104 and a database 106 or other data store or data storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Some blocks (e.g., 102, 104, and 106) may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, camera, cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications (e.g., an in-person meeting application as described herein) running on respective client devices and/or server system 102, and/or via a network service, e.g., an in-person meeting service, an image sharing service, a messaging service, a social network service or other type of network service, implemented on server system 102. For example, respective client devices 120, 122, 124, and 126 may communicate data to and from one or more server systems (e.g., server system 102). In some implementations, the server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, image compositions (e.g., albums that include one or more images, image collages, videos, etc.), audio data, and other types of content, receive various forms of data, and/or perform socially related functions. For example, the network service can allow a user to send messages to particular or multiple other users, form social links in the form of associations to other users within the network service, group other users in user lists, friends lists, or other user groups, post or send content including text, images, image compositions, audio sequences or recordings, or other types of content for access by designated sets of users of the network service, participate in live video, audio, and/or text videoconferences or chat with other users of the service, etc. In some implementations, a "user" can include one or more programs or virtual entities, as well as persons that interface with the system or network.

A user interface can enable display of images, image compositions, data, and other content as well as communications, privacy settings, notifications, and other data on client devices 120, 122, 124, and 126 (or alternatively on server system 102). Such an interface (e.g., FIG. 2) can be displayed using software on the client device, software on the server device, and/or a combination of client software and server software executing on server device 104, e.g., application software or client software in communication with server system 102. The user interface can be displayed by a display device of a client device or server device, e.g., a display screen, projector, extended reality display device, etc. In some implementations, application programs running on a server system can communicate with a client device to receive user input at the client device and to output data such as visual data, audio data, etc. at the client device.

In some implementations, server system 102 and/or one or more client devices 120-126 can provide mobile device location-based in person meeting functions.

Various implementations of features described herein can use any type of system and/or service. Any type of electronic device can make use of features described herein. Some implementations can provide one or more features described herein on client or server devices disconnected from or intermittently connected to computer networks.

Figure 2:
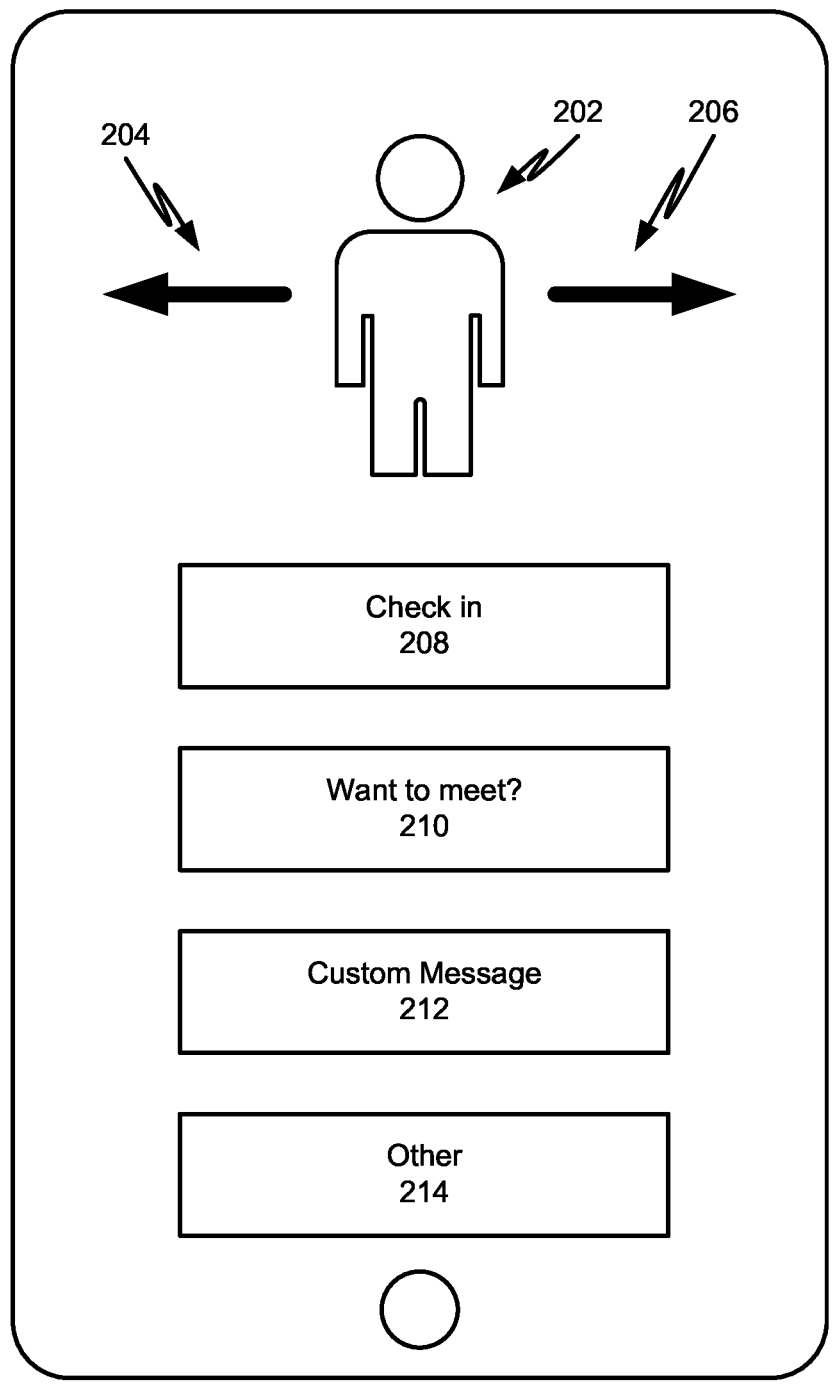
FIG. 2 is a diagram of an example graphical user interface for mobile device location-based in person meeting application software in accordance with some implementations.

FIG. 2 is a diagram of an example graphical user interface (GUI) 200 for mobile device location-based in person meeting application software in accordance with some implementations. The GUI 200 includes displayed user profile information 202 of another user that can include an image, a username, and other user profile information e.g., gender of user, gender user is interested in, type of relationship being sought, current relationship status, physical features of the user, likes/dislikes, emotional or spiritual features of the user, hobbies, interests, occupation, or any other information that may be relevant to aiding another user in determining whether to request or grant an in-person meeting with the user.

The GUI 200 can include interface elements 204/206 to permit a user to scroll through profile information of other users at a given venue or event. In some implementations, a user may only view and communicate with those other user profiles that are checked-in at a same venue or event. In other implementations, a user may view and communicate with other user profiles checked-in at a same venue or event, or may view only for venues or events that the user is not checked-in to in order to help the user decide whether to visit or attend a given venue or event.

Elements 204/206 can be displayed on the screen or can represent a direction a user gestures in. For example, a user may gesture to the left ("swipe left") to indicate no interest in a user profile and that user profile may not be displayed to the user again during the event or while at the venue. The user may also gesture to the right (or "swipe right") on a profile to indicate interest in that profile. An indication of interest may be handled in one or more ways such as by alerting the other user corresponding to the "liked" profile that it was liked by the user, keeping the liked profile in the set of profiles displayed for the venue or event, displaying further profile information for liked profiles, etc. When two users both swipe right (or perform other gesture indicating interest), the users are then able to message each other for an in person meeting such as selecting a user interface element for "Come say Hi" or the like. Also, in some implementations, detailed location information such as micro location information can be provided to users who both swipe right about the person they swiped right on such that the users may obtain the location and observe prior to indicating interest in an in person meeting.

The GUI 200 can also include other elements such as an element for checking-in 208 that, when selected, permits a user to check in to a venue or event that the user either selects and/or is physically near based on location information from the user device. The GUI 200 can include one or more elements for requesting an in-person meeting 210/212 that, when selected, causes a message to be sent to the user profile (e.g., 202) currently being displayed. The message can be a pre-formatted message (e.g., "Do you want to meet?" or "Come say hi!") 210 or can be a custom message ("Hey, you are cute! Want to meet me by the fountain?") 212.

The GUI 200 can also include one or more other elements 214 such as an element to report a user for violating standards in some way, "bookmark" a user profile for future venues or events, switch the user's profile (e.g., when a user has different profile settings for different occasions or settings, where the different profiles may differ in some aspect).

Figure 3:
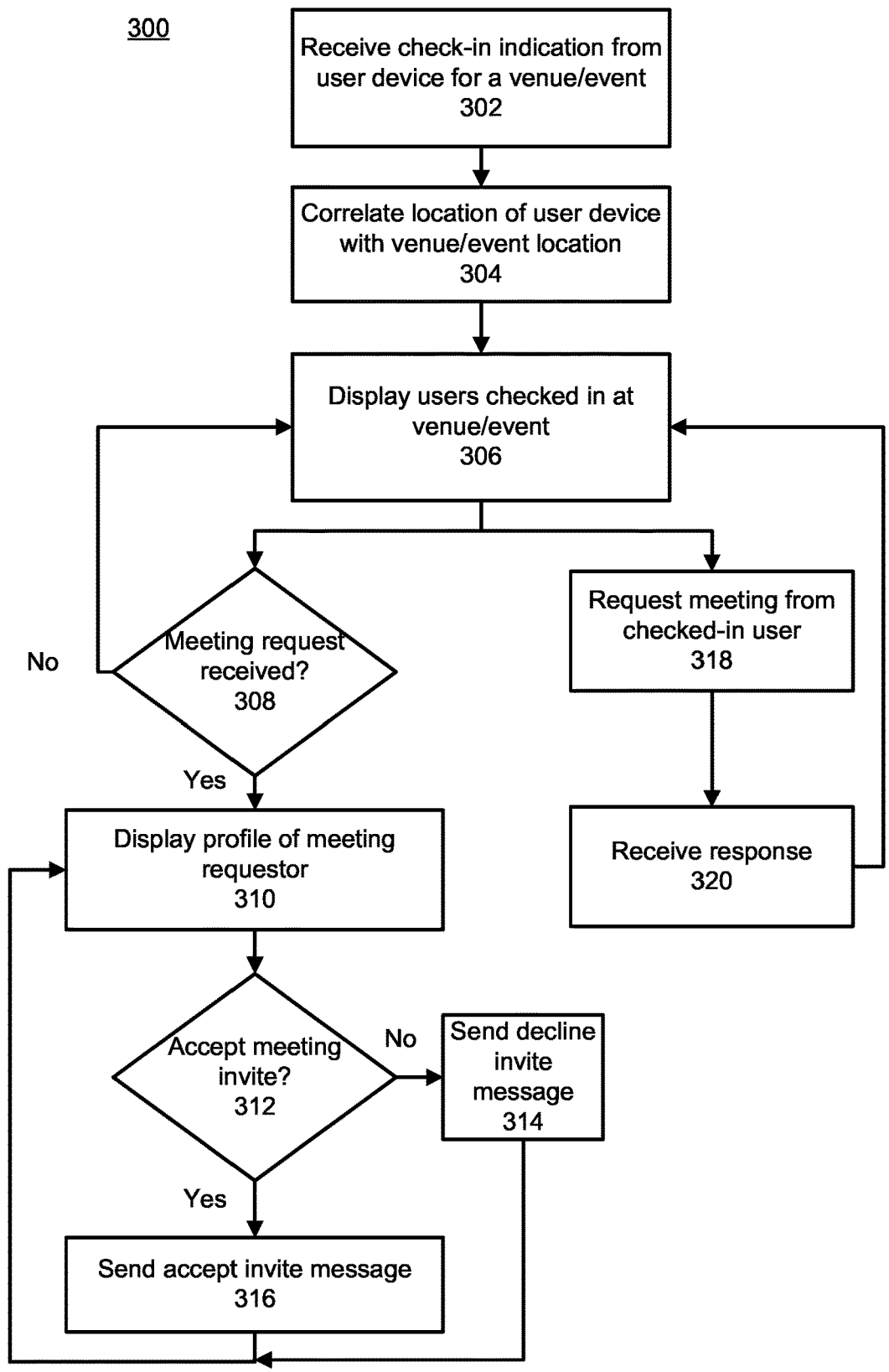
FIG. 3 is a flowchart of an example method for mobile device location-based application to facilitate in person meetings between users in accordance with some implementations.

FIG. 3 is a flowchart of an example method 300 for mobile device location-based application to facilitate in-person meetings between users in accordance with some implementations. Processing begins at 302, where a check-in indication is received from a user device associated with a user of the in-person meeting system. A check-in indication can include an electronic indication that the user is present at a venue or event as selected by the user (e.g., from within the in-person meeting mobile app) or as indicated by the location of the user device as determined by the location determination capabilities of the user device (e.g., GPS, Wi-Fi, cellular radio location, Bluetooth, scanning an RF beacon via RF transceiver within the user device or a visual beacon via an imaging sensor within the user device, etc.). Processing continues to 304.

At 304, the location of the venue or event checked into by the user is optionally correlated with the location of the user device. Processing continues to 306.

At 306, users checked in at a given venue or event are displayed. For example, some or all of the profile information of one or more users are displayed to other users, where the users are all checked into the same venue or event. The order of the displayed profiles may be arranged according to a likelihood of matching (i.e., likelihood of receiving or granting an in-person meeting request from the user as determined by a machine learning model described herein or other technique). Processing continues in two paths: one for receiving in-person meeting requests (308) and one for requesting an in-person meeting (318).

At 308, it is determined if an in-person meeting request was received. If so, processing continues to 310.

At 310, all or a portion of the user profile of the in-person meeting requestor is displayed. Processing continues to 312.

At 312, it is determined whether the invitation for an in-person meeting is accepted (or granted). If the in-person meeting invite is accepted, processing continues to 316. Otherwise, processing continues to 314.

At 316, an accepted invitation message is sent to the requesting user device. From here the users can meet in-person and continue their conversation.

At 314, a decline message is sent to the requesting user. Alternatively, no decline message is sent, only accept messages are sent to requesting users to avoid a negative message being sent.

At 318, a user requests an in-person meeting from another user checked in at the venue or event. For example, the user could use GUI elements 210 or 212 to request or extend an invitation for an in-person meeting. Processing continues to 320, where a response is received from the other user. The response can be an accepted invitation, no response, or optionally a decline invitation response. Based on the response received, the user and the other user may meet in-person.

Figure 5:
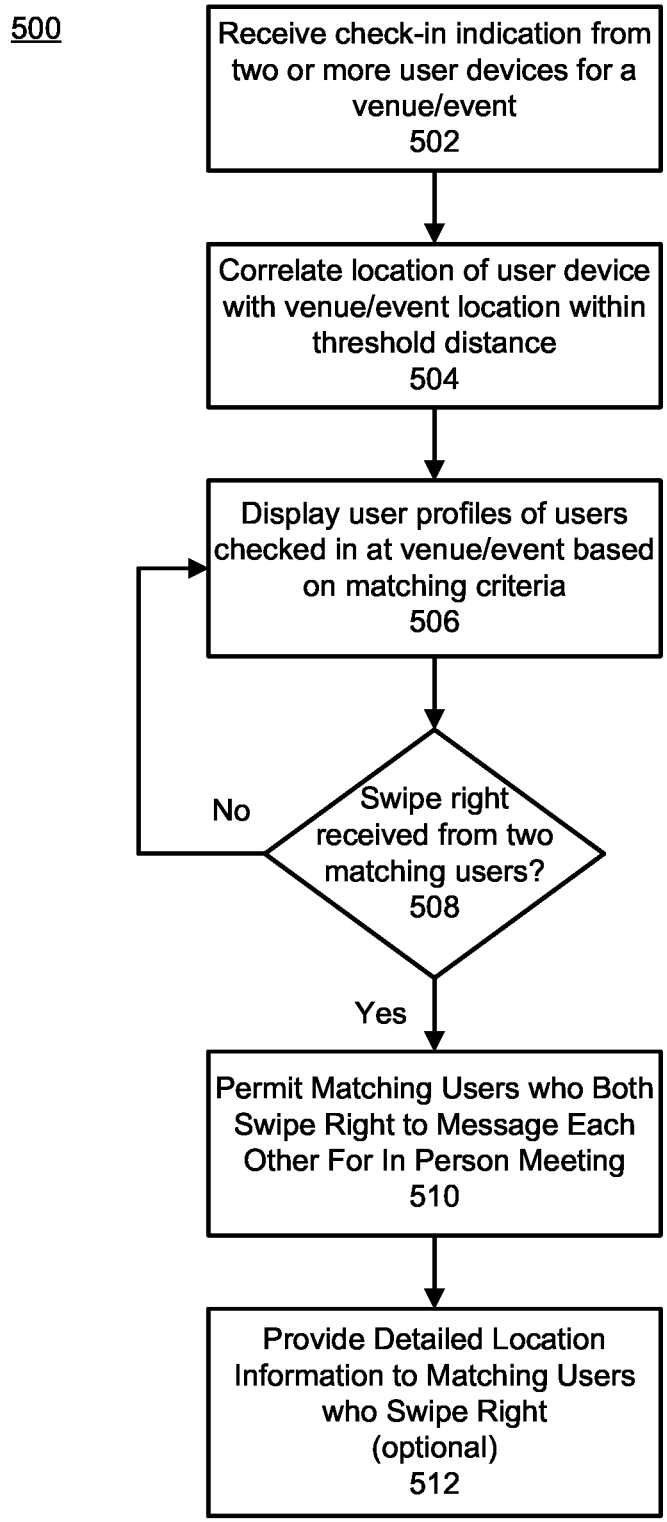
FIG. 5 is a flowchart of another example method for mobile device location-based application to facilitate in-person meetings between users in accordance with some implementations.

FIG. 5 is a flowchart of another example method 500 for mobile device location-based application to facilitate in-person meetings between users in accordance with some implementations. Processing begins at 502, where a check-in indication is received from a user device associated with a user of the in-person meeting system. A check-in indication can include an electronic indication that the user is present at a venue or event as selected by the user (e.g., from within the in-person meeting mobile app) or as indicated by the location of the user device as determined by the location determination capabilities of the user device (e.g., GPS, Wi-Fi, cellular radio location, Bluetooth, scanning an RF beacon via RF transceiver within the user device or a visual beacon via an imaging sensor within the user device, etc.). Or, in some implementations, the check-in location can be associated with a form of transportation such as an aircraft, cruise ship, train, or the like. The location can be a future location that people are travelling to, for example, users can check in and see who is bound for a given destination or, in another example, who is or is going to be on a cruise ship with them. The check in location can include a multi-part location such as an aircraft, cruise ship, or train forming a first part and then a destination venue forming a second part of the location. In such cases, users may first meet connect with each other in the application based on the first part of the location and then arrange for an in person meeting at a second part of the location. The first and second locations (or location parts) can be on the same or different vehicles, vessels, or areas. Processing continues to 504.

At 504, the location of the venue or event checked into by the user is optionally correlated with the location of the user device. For example, users may only be able to check in to a location when the user device determines the device is within a threshold distance of the location. Processing continues to 506.

At 506, users checked in at a given venue or event and matching with a given user are displayed. For example, some or all of the profile information of one or more users are displayed to other users, where the users are all checked into the same venue or event. The order of the displayed profiles may be arranged according to a likelihood of matching (i.e., likelihood of receiving or granting an in-person meeting request from the user as determined by a machine learning model described herein or other technique). When a user indicates interest in another user that is displayed (e.g., swipes right) the system can optionally notify the other user to give the other user the opportunity to swipe right at the given user profile to indicate interest or swipe left to indicate no interest. Processing continues to 508.

At 508, it is determined whether two users have swiped right on each other. If so, processing continues to 510. Otherwise processing continues to 506.

At 510, the system permits the two users that have swiped right on each other to message each other as described above. For example, a user can request an in-person meeting from another user checked in at the venue or event, which have both swiped right on each other's profiles within the system. For example, the user could use GUI elements 210 or 212 to request or extend an invitation for an in-person meeting. Processing continues to 320, where a response is received from the other user. The response can be an accepted invitation, no response, or optionally a decline invitation response. Based on the response received, the user and the other user may meet in-person. Location information for the meeting can be provided in the message from the user (e.g., "Meet me by the fountain") or can be provided by the devices via location technologies such as GPS or micro location technology or service described herein. Processing continues to 512.

At 512, the system optional provides detailed location information about users who swipe right on each other to the other user. In other words, detailed location information about user 1 is sent to user 2 and detailed location information about user 2 is sent to user 1 when both user 1 and user 2 swipe right on each other. This permits the users to possibly observe the other user before a meeting or to facilitate an in person meeting by providing detailed location information. The detailed location information can be provided by micro location services or technologies such as near field communications (NFC), Bluetooth, beacons, and/ or virtual beacons.

Figure 4:
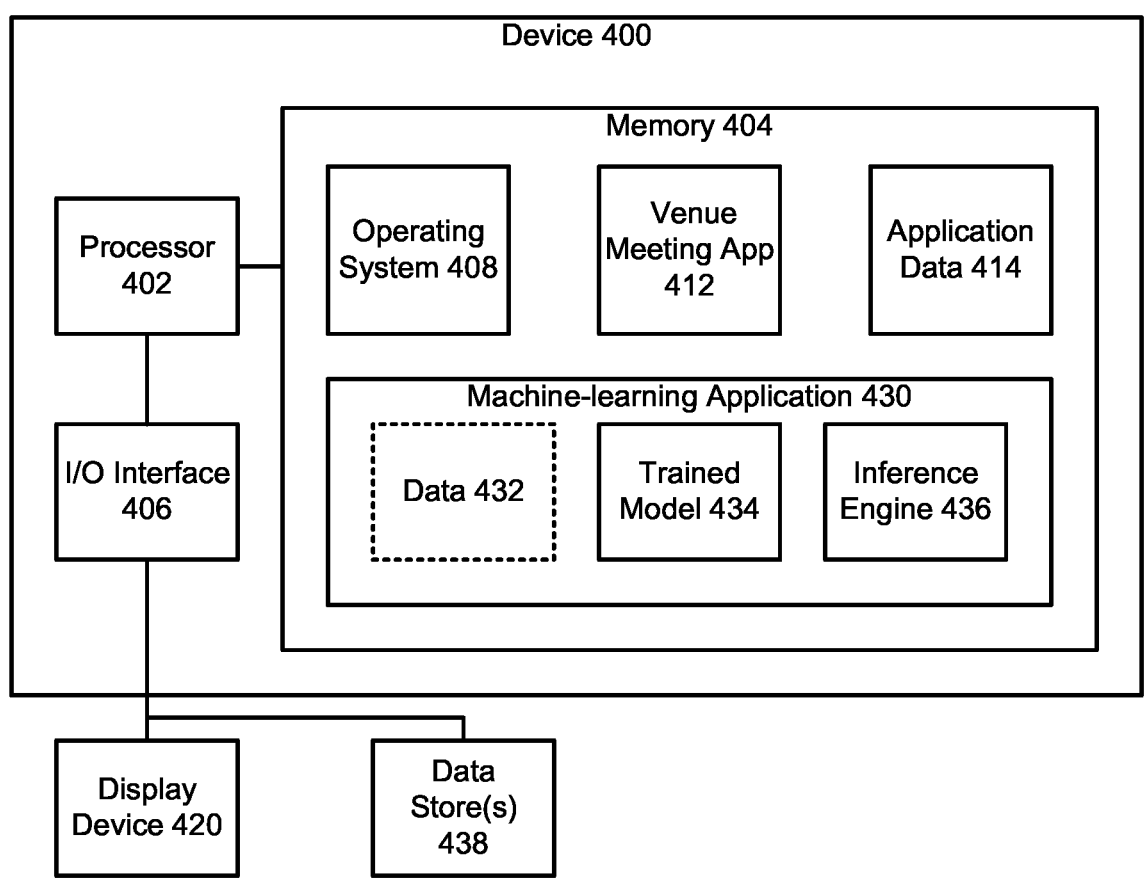
FIG. 4 is a block diagram of an example computing device which may be used for one or more implementations described herein.

FIG. 4 is a block diagram of an example device 400 which may be used to implement one or more features described herein. In one example, device 400 may be used to implement a client device, e.g., any of client devices 120-126 shown in FIG. 1. Alternatively, device 400 can implement a server device, e.g., server device 104, etc. In some implementations, device 400 may be used to implement a client device, a server device, or a combination of the above. Device 400 can be any suitable computer system, server, or other electronic or hardware device as described above.

One or more methods described herein (e.g., 300) can be run in a standalone program that can be executed on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, head mounted display, etc.), laptop computer, etc.).

In one example, a client/server architecture can be used, e.g., a mobile computing device (as a client device) sends user input data to a server device, which performs the computations, and receives from the server the final output data for output (e.g., for display). In another example, all computations can be performed within the mobile app (and/or other apps) on the mobile computing device. In another example, computations can be split between the mobile computing device and one or more server devices.

In some implementations, device 400 includes a processor 402, a memory 404, and I/O interface 406. Processor 402 can be one or more processors and/or processing circuits to execute program code and control basic operations of the device 400. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems.

In some implementations, processor 402 may include one or more co-processors that implement neural-network processing. In some implementations, processor 402 may be a processor that processes data to produce probabilistic output, e.g., the output produced by processor 402 may be imprecise or may be accurate within a range from an expected output. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 404 is typically provided in device 400 for access by the processor 402 and may be any suitable processor-readable storage medium, such as random-access memory (RAM), read-only memory (ROM), Electrically Erasable Read-only Memory (EEPROM), Flash memory, etc., suitable for storing instructions for execution by the processor, and located separate from processor 402 and/or integrated therewith. Memory 404 can store software operating on the server device 400 by the processor 402, including an operating system 408, machine-learning application 430, in person meeting application 412, and application data 414. Other applications may include applications such as a data display engine, web hosting engine, image display engine, notification engine, social networking engine, etc. In some implementations, the machine-learning application 430 and in person meeting application 412 can each include instructions that enable processor 402 to perform functions described herein, e.g., some or all of the methods of FIG. 3.

The device 400 can also include an in-person meeting application 412 as described herein and other applications. One or more methods disclosed herein (e.g., 300) can operate in several environments and platforms, e.g., as a stand-alone computer program that can run on any type of computing device, as a web application having web pages, as a mobile application ("app") run on a mobile computing device, etc.

In various implementations, machine-learning application 430 may utilize Bayesian classifiers, support vector machines, neural networks, or other learning techniques. In some implementations, machine-learning application 430 may include a trained model 434, an inference engine 436, and data 432. In some implementations, data 432 may include training data, e.g., data used to generate trained model 434. For example, training data may include any type of data suitable for training a model for in person meeting tasks, such as previous selections, meeting requests sent or received, etc. associated with in person meeting facilitation functions described herein. Training data may be obtained from any source, e.g., a data repository specifically marked for training, data for which permission is provided for use as training data for machine-learning, etc. In implementations where one or more users permit use of their respective user data to train a machine-learning model, e.g., trained model 434, training data may include such user data. In implementations where users permit use of their respective user data, data 432 may include permitted data.

In some implementations, data 432 may include collected data such as "swipes" or other indications between two or more users, in person meeting requests and data associated with users sending or receiving requests, etc. In some implementations, training data may include synthetic data generated for the purpose of training, such as data that is not based on user input or activity in the context that is being trained, e.g., data generated from simulated conversations, computer-generated images, etc. In some implementations, machine-learning application 430 excludes data 432. For example, in these implementations, the trained model 434 may be generated, e.g., on a different device, and be provided as part of machine-learning application 430. In various implementations, the trained model 434 may be provided as a data file that includes a model structure or form, and associated weights. Inference engine 436 may read the data file for trained model 434 and implement a neural network with node connectivity, layers, and weights based on the model structure or form specified in trained model 434.

Machine-learning application 430 also includes a trained model 434. In some implementations, the trained model 434 may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 432 or application data 414. Such data can include, for example, a user and one or more candidate matches for that user at a venue or event, e.g., when the trained model is used for in-person meeting functions. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may be a set of one or more likely matches for a given user, an ordered list of potential matches ranked by predicted likelihood of the given user selecting a matching user for an in-person meeting, etc. depending on the specific trained model. In some implementations, model form or structure also specifies a number and/or type of nodes in each layer.

In different implementations, the trained model 434 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output.

In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 434 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 432, to produce a result.

For example, training may include applying supervised learning techniques. In supervised learning, the training data can include a plurality of inputs (e.g., a set of images and other user profile information) and a corresponding expected output for each input (e.g., one or more labels for each user profile indicating estimated likelihood that a given user will select that profile for an in-person meeting). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to identify one or more users associated with images and/or other features for potential match recommendation.

In another example, a model trained using unsupervised learning may cluster users based on the use of the words in data sources. In some implementations, unsupervised learning may be used to produce knowledge representations, e.g., that may be used by machine-learning application 430. In various implementations, a trained model includes a set of weights, or embeddings, corresponding to the model structure. In implementations where data 432 is omitted, machine-learning application 430 may include trained model 434 that is based on prior training, e.g., by a developer of the machine-learning application 430, by a third-party, etc. In some implementations, trained model 434 may include a set of weights that are fixed, e.g., downloaded from a server that provides the weights.

Machine-learning application 430 also includes an inference engine 436. Inference engine 436 is configured to apply the trained model 434 to data, such as application data 414, to provide an inference. In some implementations, inference engine 436 may include software code to be executed by processor 402. In some implementations, inference engine 436 may specify circuit configuration (e.g., for a programmable processor, for a field programmable gate array (FPGA), etc.) enabling processor 402 to apply the trained model. In some implementations, inference engine 436 may include software instructions, hardware instructions, or a combination. In some implementations, inference engine 436 may offer an application programming interface (API) that can be used by operating system 408 and/or in-person application 412 to invoke inference engine 436, e.g., to apply trained model 434 to application data 414 to generate an inference.

Machine-learning application 430 may provide several technical advantages. For example, when trained model 434 is generated based on unsupervised learning, trained model 434 can be applied by inference engine 436 to produce knowledge representations (e.g., numeric representations) from input data, e.g., application data 414. For example, a model trained for in person meeting functions or tasks may produce predictions and confidences for given input information about one or more candidate matches for a given user. A model trained for suggesting or ranking potential candidates for in person meetings may produce a suggestion for one or more users who have checked-in at a given venue or event based on input images, user profile, past in person meeting information, or other information. In some implementations, such representations may be helpful to reduce processing cost (e.g., computational cost, memory usage, etc.) to generate an output (e.g., a suggestion, a prediction, a classification, etc.). In some implementations, such representations may be provided as input to a different machine-learning application that produces output from the output of inference engine 436.

In some implementations, knowledge representations generated by machine-learning application 430 may be provided to a different device that conducts further processing, e.g., over a network. In such implementations, providing the knowledge representations rather than the images may provide a technical benefit, e.g., enable faster data transmission with reduced cost. In another example, a model trained for in-person meeting match prediction may produce a likelihood of selection for one or more user profiles being processed by the model.

In some implementations, machine-learning application 430 may be implemented in an offline manner. In these implementations, trained model 434 may be generated in a first stage and provided as part of machine-learning application 430. In some implementations, machine-learning application 430 may be implemented in an online manner. For example, in such implementations, an application that invokes machine-learning application 430 (e.g., operating system 408, one or more of in-person meeting application 412 or other applications) may utilize an inference produced by machine-learning application 430, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 434, e.g., to update embeddings for trained model 434.

In some implementations, machine-learning application 430 may be implemented in a manner that can adapt to particular configuration of device 400 on which the machine-learning application 430 is executed. For example, machine-learning application 430 may determine a computational graph that utilizes available computational resources, e.g., processor 402. For example, if machine-learning application 430 is implemented as a distributed application on multiple devices, machine-learning application 430 may determine computations to be carried out on individual devices in a manner that optimizes computation. In another example, machine-learning application 430 may determine that processor 402 includes a GPU with a particular number of GPU cores (e.g., 1000) and implement the inference engine accordingly (e.g., as 1000 individual processes or threads).

In some implementations, machine-learning application 430 may implement an ensemble of trained models. For example, trained model 434 may include a plurality of trained models that are each applicable to same input data. In these implementations, machine-learning application 430 may choose a particular trained model, e.g., based on available computational resources, success rate with prior inferences, etc. In some implementations, machine-learning application 430 may execute inference engine 436 such that a plurality of trained models is applied. In these implementations, machine-learning application 430 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ins) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 408 or one or more other applications, e.g., in-person meeting application 412.

In different implementations, machine-learning application 430 can produce different types of outputs. For example, machine-learning application 430 can provide representations or clusters (e.g., numeric representations of input data), labels (e.g., for input data that includes past selections or in-person meeting requests, etc.), phrases or sentences (e.g., descriptive of an image or video, suitable for use as a response to an input sentence, suitable for use to determine context during a conversation, etc.), images (e.g., generated by the machine-learning application in response to input), audio or video (e.g., in response an input video), machine-learning application 430 may produce output predicting likelihood of a user selecting another user for an in-person meeting, etc. In some implementations, machine-learning application 430 may produce an output based on a format specified by an invoking application, e.g., operating system 408 or one or more applications, e.g., in-person meeting application 412. In some implementations, an invoking application may be another machine-learning application. For example, such configurations may be used in generative adversarial networks, where an invoking machine-learning application is trained using output from machine-learning application 430 and vice-versa.

Any of software in memory 404 can alternatively be stored on any other suitable storage location or computer-readable medium. In addition, memory 404 (and/or other connected storage device(s)) can store one or more messages, one or more taxonomies, electronic encyclopedia, dictionaries, thesauruses, knowledge bases, message data, grammars, user preferences, and/or other instructions and data used in the features described herein. Memory 404 and any other type of storage (magnetic disk, optical disk, magnetic tape, or other tangible media) can be considered "storage" or "storage devices."

I/O interface 406 can provide functions to enable interfacing the server device 400 with other systems and devices. Interfaced devices can be included as part of the device 400 or can be separate and communicate with the device 400. For example, network communication devices, storage devices (e.g., memory and/or database 106), and input/output devices can communicate via I/O interface 406. In some implementations, the I/O interface can connect to interface devices such as input devices (keyboard, pointing device, touchscreen, microphone, camera, scanner, sensors, etc.) and/or output devices (display devices, speaker devices, printers, motors, etc.).

Some examples of interfaced devices that can connect to I/O interface 406 can include one or more display devices 420 and one or more data stores 438 (as discussed above). The display devices 420 that can be used to display content, e.g., a user interface of an output application as described herein. Display device 420 can be connected to device 400 via local connections (e.g., display bus) and/or via networked connections and can be any suitable display device. Display device 420 can include any suitable display device such as an LCD, LED, or plasma display screen, CRT, television, monitor, touchscreen, 3-D display screen, or other visual display device. For example, display device 420 can be a flat display screen provided on a mobile device, multiple display screens provided in a goggles or headset device, or a monitor screen for a computer device.

The I/O interface 406 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 4 shows one block for each of processor 402, memory 404, I/O interface 406, and software blocks 408, 412, and 430. These blocks may represent one or more processors or processing circuitries, operating systems, memories, I/O interfaces, applications, and/or software modules. In other implementations, device 400 may not have all of the components shown and/or may have other elements including other types of elements instead of, or in addition to, those shown herein. While some components are described as performing blocks and operations as described in some implementations herein, any suitable component or combination of components of environment 100, device 400, similar systems, or any suitable processor or processors associated with such a system, may perform the blocks and operations described.

In some implementations, logistic regression can be used for personalization (e.g., personalizing in-person meeting suggestions based on a user's pattern of in-person meeting activity). In some implementations, the prediction model can be handcrafted including hand selected labels and thresholds. The mapping (or calibration) from ICA space to a predicted precision within the in-person meeting space can be performed using a piecewise linear model.

In some implementations, the in-person meeting system could include a machine-learning model (as described herein) for tuning the system (e.g., selecting potential matches and corresponding thresholds) to potentially provide improved accuracy. Inputs to the machine learning model can include ICA labels, an image descriptor vector that describes appearance and includes semantic information about user profiles. Example machine-learning model input can include labels for a simple implementation and can be augmented with descriptor vector features for a more advanced implementation. Output of the machine-learning module can include a prediction of how likely it is for a given user to select another user at a venue or event for an in-person meeting.

One or more methods described herein (e.g., method 300) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A system comprising:
one or more processors coupled to a computer-readable medium having stored thereon software instructions that, when executed by the one or more processors, cause the one or more processors to perform operations including:
receiving a check-in message from a first mobile device, where the check-in message is associated with a location, wherein the location includes a multi-part location, and wherein the multi-part location includes a mode of transportation forming a first part of the multi-part location and a destination venue forming a second part of the multi-part location;
comparing the location in the check-in message with location data of the first mobile device;
determining, based on the comparing, the first mobile device is within a given threshold distance of the location;
causing any other matching users associated with a respective mobile device checked-in to a same location as the first mobile device to be displayed on the first mobile device;
when a user associated with the first mobile device indicates interest in another user and the other user indicates interest in the user of the first mobile device, permitting the user and the other user to send in-person meeting requests to each other;
when an in-person meeting request is received, displaying at least a portion of a user profile of an in-person meeting requestor on the first mobile device;
when the in-person meeting request is accepted, transmitting an in-person meeting request message to a mobile device corresponding to the in-person meeting requestor; and
when the in-person meeting request is declined, transmitting a decline message to the mobile device corresponding to the in-person meeting requestor.

2. The system of claim 1, wherein the operations further include:
transmitting an in-person meeting request from the first mobile device to a mobile device of another user, wherein GUI elements are used to extend an invitation for an in-person meeting; and
receiving a response from the mobile device of the other user, wherein the response includes one of an accepted invitation, no response, or a decline invitation response.

3. The system of claim 1, wherein the location can be associated with a form of transportation.

4. The system of claim 1, wherein the location is a future location that the user and other user are travelling to.

5. The system of claim 1, wherein the user and another user are permitted to connect based on the first part of the multi-part location and then arrange for an in person meeting at the second part of the multi-part location.

* * * * *